April 14, 1953 C. L. WECKESSER 2,634,857
IMPROVEMENT IN PACKAGING
Filed Nov. 13, 1946
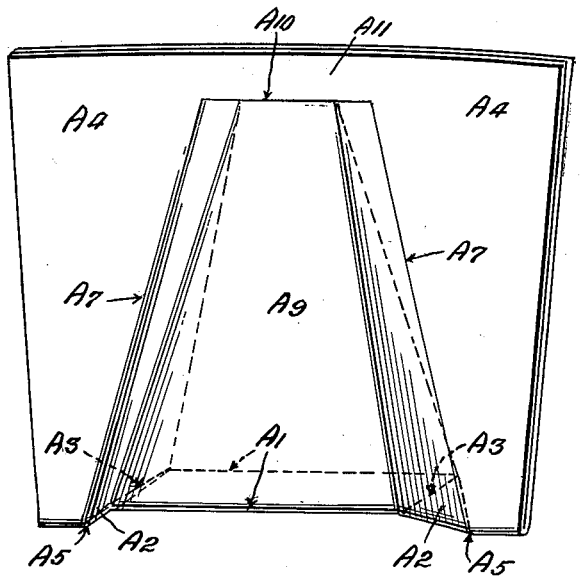
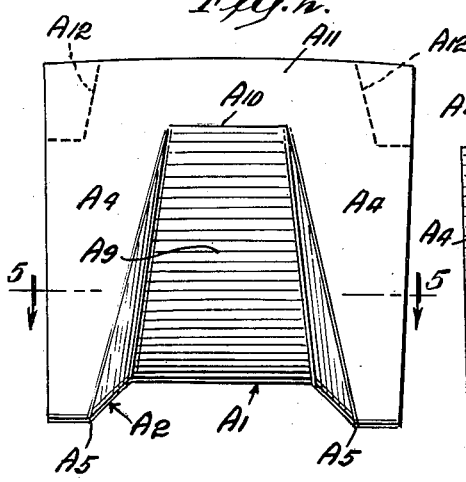
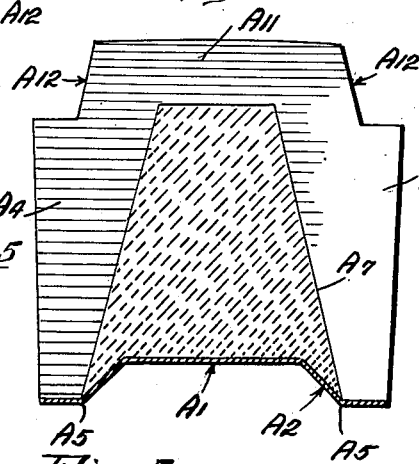
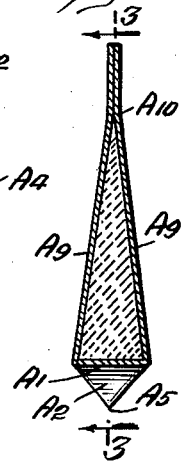
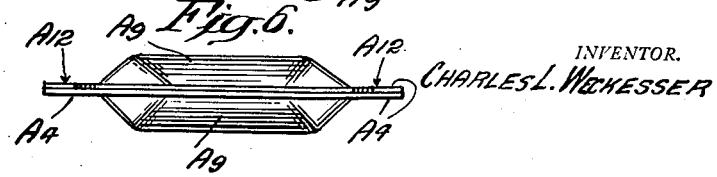
INVENTOR.
CHARLES L. WECKESSER
BY Byerly, Townsend & Watson
ATTORNEYS Patented Apr. 14, 1953

2,634,857

UNITED STATES PATENT OFFICE 2,634,857

IMPROVEMENT IN PACKAGING

Charles L. Weckesser, Norwich, N. Y.

Application November 13, 1946, Serial No. 709,627

3 Claims. (Cl. 206—63.2)

This invention relates to packaging. A particular object of the invention is to provide a new wrapped molded article for medicinal use, such as a wrapped suppository.

Suppositories are ordinarily molded of waxlike material which has a melting point at or near body temperature. They have a particular tapered form which is essential for their intended use. In the past, it has been impossible to keep suppositories in warm weather without refrigeration, for, regardless of how they may be wrapped, they soften or melt and, even if they do not leak from the wrapepr, they lose their intended form and thereby become useless.

My invention overcomes this difficulty and provides an article having many advantages. In accordance with my invention, a sheet of metal foil or the like is used both as a mold for forming a suppository and as a wrapper for the suppository which has been molded in it. The opening in the mold for introduction of the material to be molded is hermetically sealed after the material has been introduced. The metal foil acts, not only as a sealed wrapper completely protecting the molded article, but also as a continuously available mold which retains the waxlike material in the proper tapered form, even if the material is softened or melted. The new wrapped suppository is, therefore, not injured by subjecting it to temperatures above the melting point of the suppository mass.

The foil which constitutes both the mold and the wrapper is die-formed, without stretching or wrinkling of the sheet of foil. It is given the shape of a wide-bottomed pocket whose top may be opened or closed without changing the shape of its bottom. The form of the pocket is such that when the pocket is closed at the top it has the tapered shape required for a suppository.

In order that my invention may be clearly understood, I will describe in detail a particular wrapped suppository embodying my invention. In this description, I shall refer to the accompanying drawings in which:

Fig. 1 is a perspective view of my wrapped suppository illustrating, partially by dotted lines, the shape of the suppository mass;

Fig. 2 is a side view of my wrapped suppository;

Fig. 3 is an axial section along the lines 3—3 of Fig. 4;

Fig. 4 is a transverse section on the center line of Fig. 2;

Fig. 5 is a horizontal section along the lines 5—5 of Fig. 2; and

Fig. 6 is a top view of my wrapped suppository.

The wrapped suppository illustrated in the drawing comprises a tapered, molded mass of an easily meltable material, such as medicated wax, completely sealed in a self-supporting wrapping consisting of a single piece of pliant metal foil coated on its inner surface with a thermoplastic adhesive capable of sealing in the presence of grease. The botom of the wrapped suppository has the flat central portion A1 and two downwardly inclined pointed end portions A2. This bottom is formed without stretching or creasing the foil and has considerable rigidity owing to its transverse crease lines or angles A3. The side walls A9 of the pocket enclosing the wrapped suppository extend upward from the flat bottom and incline inwardly so that they come together at a line A10.

The side edges and top of the wrapped suppository are completely surrounded by an extending flange consisting of the side flanges A4, extending along the side edges A7 from the apices A5 of the inclined ends A2 to the top of the pocket, and a top flange A11 formed by the closing and sealing of the top of the pocket. The flange consists of two layers of metal foil sealed together around the sides and top of the suppository so that the flange, the side walls and the metal foil across the bottom of the suppository completely enclose and protect the molded material. The dieformed foil keeps the molded material in the desired shape if it becomes melted.

The presence of the flanges A4, A11 provides a convenient means for removing the wrapper when the molded suppository is to be used. The flange may easily be torn from the molded material, or, since the two layers of foil are sealed together only along the inner part of the flange, the two layers may be separated at the outer part of the flange and torn apart. To facilitate the latter operation, it is desirable, but not necessary, to provide notches A12 in the corners of one of the layers forming the flange. These notches may be cut in the sheet of foil before the foil is formed into a mold.

The wrapped suppository which has been described can be made manually. However, I prefer to make the same by the method and with the apparatus described and claimed in my divisional application Serial No. 790,609, filed December 9, 1947.

What I claim is:

1. A package comprising a molded article having a bottom with a flat middle portion and downwardly-inclined pointed end portions and tapering from said bottom to a sharp edge at its top, and a self-supporting covering for said article comprising a single piece of pliant sheet material extending across the bottom of the article and having sealed-together flanges extending around the sides and top of the article from the apex of one end portion of the bottom to the apex of the other end portion of the bottom.

2. A package comprising a molded article having a bottom with a flat middle portion and downwardly-inclined pointed end portions and tapering from said bottom to a sharp edge at its top, and a self-supporting covering for said article comprising a single piece of pliant metal foil extending across the bottom of the article and having sealed-together flanges extending around the sides and top of the article from the apex of one end portion of the bottom to the apex of the other end portion of the bottom.

3. A package comprising a sealed tapered self-supporting envelope of a single piece of pliant metal foil having a bottom with a flat rectangular middle portion and triangular downwardly inclined end portions meeting said middle portion along transverse lines, sealed-together flanges extending around the sides and top of the envelope, and an easily meltable substance filling the envelope.

CHARLES L. WECKESSER.

References Cited in the file of this patent

UNITED STATES PATENTS

| Number | Name | Date |
|---|---|---|
| 108,271 | Lucas | Oct. 11, 1870 |
| 1,143,609 | Bryner | June 22, 1915 |
| 1,782,526 | Beardsley | Nov. 25, 1930 |
| 2,050,270 | Burnham | Aug. 11, 1936 |
| 2,092,858 | Richard | Sept. 14, 1937 |
| 2,103,389 | Salfisberg | Dec. 28, 1937 |
| 2,195,740 | Salfisberg | Apr. 2, 1940 |
| 2,232,088 | Waters | Feb. 18, 1941 |
| 2,269,533 | Howard | Jan. 13, 1942 |
| 2,274,344 | Palmer | Feb. 24, 1942 |
| 2,330,361 | Howard | Sept. 28, 1943 |
| 2,420,983 | Salfisberg | May 20, 1947 |
| 2,508,962 | Moore | May 23, 1950 |